UNITED STATES PATENT OFFICE.

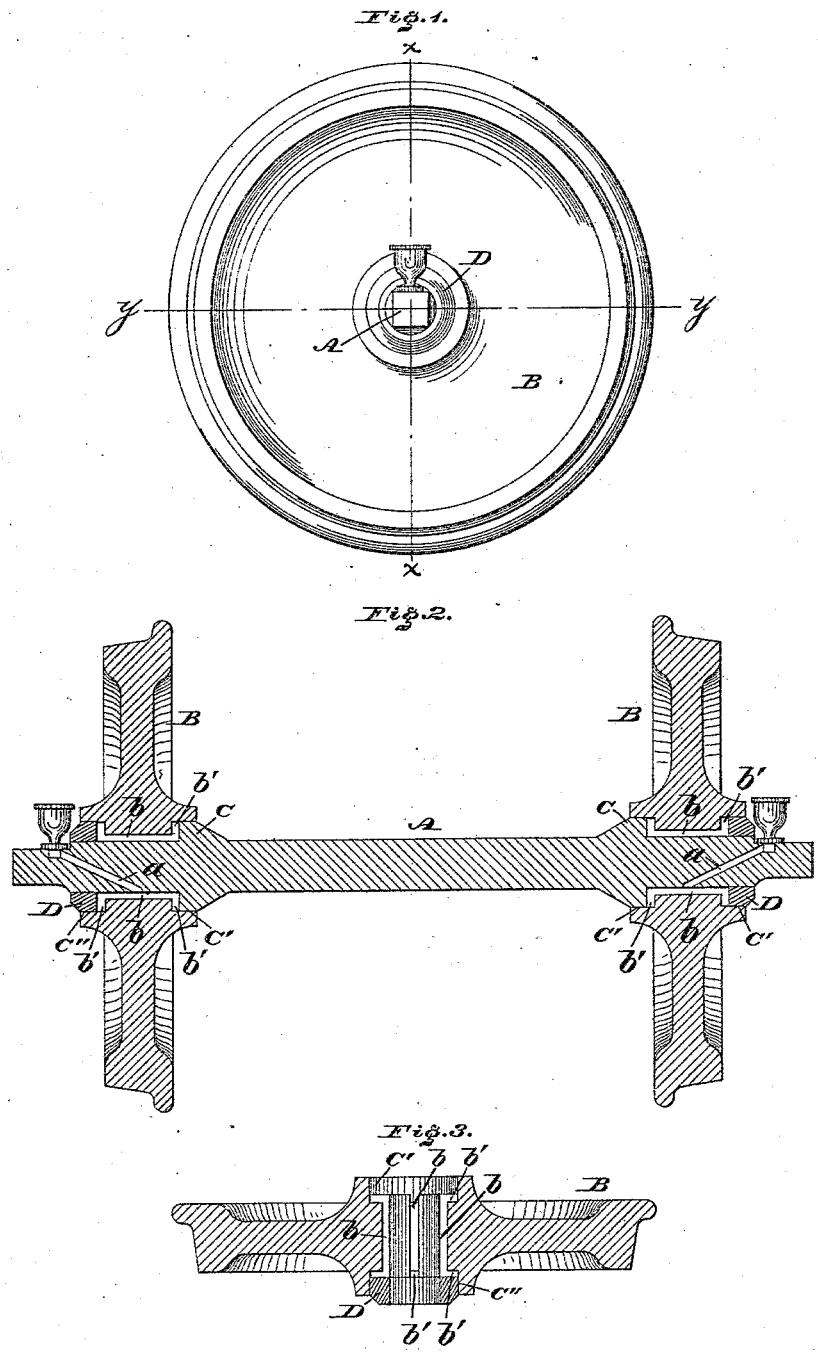

SAMUEL J. STEVENSON, OF PHILADELPHIA, PENNSYLVANIA.

CAR WHEEL AND AXLE.

SPECIFICATION forming part of Letters Patent No. 296,244, dated April 1, 1884.

Application filed November 15, 1883. (No model.)

*To all whom it may concern:*

Be it known that I, SAMUEL J. STEVENSON, a citizen of the United States, residing in the city and county of Philadelphia, State of Pennsylvania, have invented a new and useful Improvement in Car Wheels and Axles, which improvement is fully set forth in the following specification and accompanying drawings, in which—

Figure 1 is a side elevation of a car wheel and axle embodying my invention. Fig. 2 is a section thereof in line $x\ x$, Fig. 1. Fig. 3 is a section of the wheel and collars in line $y\ y$, Fig. 1.

Similar letters of reference indicate corresponding parts in the several figures.

My invention consists of a non-rotatable axle having wheels rotatably fitted thereon, collars for retaining the wheels firmly in position and laterally sustaining the same, and means for lubricating the axle and collars, as will be hereinafter fully set forth.

Referring to the drawings, A represents a car-axle, and B the wheels thereof. The portion of the axle upon which the load rests is squared, so that the axle is prevented from rotation, and the wheels are freely fitted on the axle, so as to move independently thereof. On the axle, adjacent to the inner faces of the wheels, are collars C, which may be integral with the axle or firmly affixed thereto, the wheels having recesses C' to receive said collars, thus forming abutments and bearings for the wheels on their inner faces or flanged sides, so as to retain them in position thereat and receive the lateral strain to which they are subjected. The outer end of each hub portion of a wheel has a recess, C'', to receive an annulus or collar, D, which is firmly affixed to the axle, thus completely closing the opening of the hub, forming a bearing on which the outer end of the hub portion rotates, and serving to retain the wheel in position, it being seen that the wheel is confined on opposite faces by a collar, C, and a collar or annulus, D. In the ends of the axle are ducts $a$, which extend diagonally from the top to the bottom of the axle, the upper end of each duct being in communication with a suitable oil-cup secured to the axle, the lower end of the duct opening at or about the center of the bearing-surface of the wheel. On the inner face of the hub or bearing portion of the wheel are transversely-extending grooves or pockets $b$, which, extending from end to end of the hub, and continued radially in front and rear, as at $b'$, are closed in front by the collar or annulus D, and at rear by the collar C.

It will be seen that oil or lubricant leaves the cups and enters the ducts $a$, and, emerging therefrom, is caught by the grooves or pockets $b$, and so carried around the axles, whereby the latter are properly lubricated, the collars being also lubricated by the radial ducts $b'$, so that all of the parts in contact receive an ample and equable supply of lubricant, the escape of which is prevented by the collars C D, as is evident. As the wheels rotate on the axle independently of each other they are relieved of great strain in running around curves, and thus the wear and tear of the wheels are reduced and their operation is eased, the liability of accidents due to broken or twisted axles is decreased, and the fiber of the metal of the wheels is preserved for a longer period, the reverse of these advantages existing when the wheels are fixed to and rotate with the axles.

It is evident that the improvements are equally applicable to wheels of locomotive-engines, tenders, and vehicles generally.

Having thus described my invention, what I claim as new, and desire to secure by Letters Patent, is—

1. An axle having lubricant-ducts, in combination with wheels fitted independently on said axle and formed with pockets which extend transversely on the inner faces of the hubs from end to end thereof, substantially as and for the purpose set forth.

2. In a car-axle lubricator, a wheel having pockets which extend radially on the ends of the hub thereof, and collars connected with the axle fitted in recesses in the ends of the hub, substantially as and for the purpose set forth.

3. An axle having a lubricant-duct, a loosely-fitted wheel, and collars connected with the axle fitted in recesses in the ends of the hub, said wheel having pockets which extend transversely on the inner face of the hub, and pockets which extend radially on the ends of the hub and join said transversely-extending pockets, substantially as and for the purpose set forth.

SAML. J. STEVENSON.

Witnesses:
GEORGE D. RUE,
EDMUND B. SEYMOUR.